UNITED STATES PATENT OFFICE 2,543,610

MONOAZO DYESTUFFS

Willy Steinemann, Basel, Switzerland, assignor to Sandoz Limited, Basel, Switzerland No Drawing. Application April 26, 1948, Serial No. 23,402. In Switzerland April 29, 1947

5 Claims. (Cl. 260—199)

The present invention relates to new chromable monoazo dyestuffs. It has been found that new monoazo dyestuffs may be obtained by coupling in an alkaline medium a diazotized o-aminophenol sulfonic acid, which can be substituted in the nucleus by halogen, sulfo, nitro, NH-acyl or NH.CO—O— lower alkyl groups, with compounds of the general formula

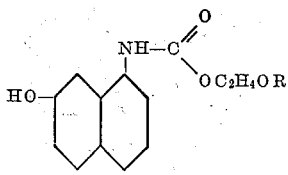

wherein R stands for alkyl. The dyestuffs thus obtained can be treated in substance or on the fibre with chroming agents and be transformed into chrome complex compounds.

As diazo compounds preferably used according to the present invention may be enumerated: 2-aminophenol-4-sulfonic acid, 2-aminophenol-4,6-disulfonic acid, 4-chloro-2-aminophenol-6-sulfonic acid, 6-chloro-2-aminophenol-4-sulfonic acid, 3.4.6-trichloro-2-aminophenol - 5 - sulfonic acid, 4-nitro-2-aminophenol-6-sulfonic acid, 6-nitro-2-aminophenol-4-sulfonic acid, 4-chloro-2 - aminophenol - 5 - sulfonic acid, 4 - methyl-2-aminophenol-5-sulfonic acid, 4-benzoylamino-2-aminophenol-6-sulfonic acid, 6-benzoyl-amino-2-aminophenol-4-sulfonic acid, 2-aminophenol-4-carbamic acid-ethyl-ester-6-sulfonic acid, 2-aminophenol-6-carbamic acid-ethyl-ester-4-sulfonic acid and so on.

The new coupling components which are used in preparing the dyestuffs according to the present invention can be obtained by treating 1.7-aminonaphthol with alkylglycol esters of chloroformic acid, preferably in presence of a binding agent, such as sodium or potassium carbonate, chalk and the like. These compounds are difficultly soluble in water, but easily soluble in ethanol and acetone.

The coupling of the diazotized o-aminophenol sulfonic acids with the coupling components of the above cited structure is carried out in the conventional manner in an aqueous solution in presence of an alkaline agent, the new dyestuffs being thus produced in a good yield.

As compared to similar dyestuffs prepared according to the process described in British Patent No. 597,542 from 7-hydroxynaphthyl-1-carbamic acid alkyl esters, the new well crystallizable dyestuffs possess the advantage of being better soluble, while possessing the same good fastness properties. They are especially suitable for being used as afterchroming dyestuffs and most of them are suitable for the neutral one-bath chrome dyeing process. When treated in substance with chroming agents they can be transformed into valuable well crystallized chrome complex compounds. When dyed on wool according to the after-chroming or to the one-bath chroming process they give grey, bluish-grey, blue and olive tints of good fastness properties to light and very good fastness properties to washing and milling.

The chrome complex derivatives dye wool from an acid bath in similar, but rather more brilliant shades of good fastness properties and in level shades.

The following examples, without being limitative illustrate the present invention, the parts being by weight.

Example 1

22.4 parts of 4-chloro-2-aminophenol-6-sulfonic acid are diazotized and coupled in the presence of an excess of sodium carbonate with a solution of 26.1 parts of 1-(7-hydroxynaphthyl)-carbamic acid methylglycol ester dissolved in 300 parts of water in presence of 4 parts of sodium hydroxide. The dyestuff thus obtained is isolated by salting out and filtering; in dry state it is a dark violet powder, soluble in concentrated sulfuric acid with a bluish-red coloration. The dyestuff possesses the formula

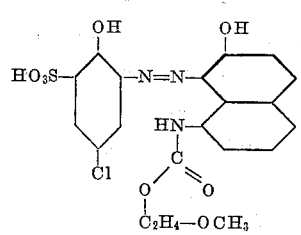

It dyes wool according to the one-bath chrome dyeing process from a neutral bath in brilliant blue-green shades possessing an excellent washing, milling and light fastness.

The coupling compound used above has been prepared by reaction of chloroformic acid methylglycol ester (B. P. 13 mm.: 58–59° C.) with 1.7-aminonaphthol and has the melting point of 96° C.

For the preparation of the chrome complex compound the quantity of the dyestuff obtained as above is suspended in 1,600 parts of water containing 75 parts of sulfuric acid 10% and 75 parts of chrome alum and heated under a reflux condenser to the boil for 24 hours. After cooling down the dyestuff, which precipitates in a well crystallized form, is filtered off and dried. In dry state, it is a dark violet powder, soluble in concentrated sulfuric acid with a bluish-red coloration.

The new chrome complex compound dyes wool from a sulfuric acid bath into blue shades possessing excellent fastness to washing and milling and good fastness to light.

Example 2

22.4 parts of 4-chloro-2-aminophenol-6-sulfonic acid are diazotized and coupled in the presence of an excess of sodium carbonate with 27.5 parts of 1-(7-hydroxynaphthyl)-carbamic acid ethyl glycol ester dissolved in 300 parts of water together with 4 parts of sodium hydroxide. The dyestuff thus obtained is isolated by salting out and filtering and is, in dry state, a dark powder soluble in concentrated sulfuric acid with a bluish red coloration. Its formula is:

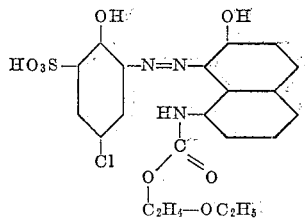

It dyes wool from a neutral bath according to the one-bath chrome dyeing process into brilliant bluish grey shades possessing very good fastness properties to washing, to milling and to light.

The coupling component used in this example has been obtained by treating 1.7-aminonaphthol with chloroformic acid-ethylglycol ester (B. P. 14 mm.; 67–68° C.) and melts at 102° C.

For the preparation of the chrome complex compound the quantity of the dyestuff obtained above is suspended in 1600 parts of water containing 75 parts of sulfuric acid 10% and 75 parts of chrome alum and boiled under a reflux condenser for 24 hours. After cooling down, the chrome complex compound which precitates in well crystallized form is filtered off and dried. In dry state it is a dark violet powder, soluble in concentrated sulfuric acid with a bluish-red coloration. It dyes wool from a sulfuric acid bath into blue shades possessing excellent fastness to washing and milling and good fastness to light.

Example 3

22.4 parts of 4-chloro-2-aminophenol-6-sulfonic acid are diazotized and coupled in the presence of an excess of sodium carbonate with 30.3 parts of 1-(7-hydroxynaphthyl)-carbamic acid-n-butylglycol ester dissolved in 300 parts of water together with 4 parts of sodium hydroxide. The dyestuff thus obtained is isolated by salting out and filtering and is, in dry state, a dark violet powder, soluble in concentrated sulfuric acid with a bluish-red coloration. Its formula is:

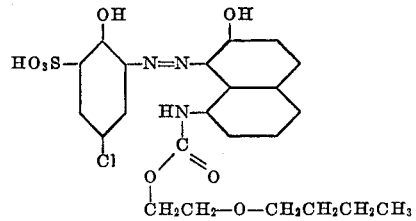

This dyestuff dyes wool from a neutral bath according to the one-bath chrome dyeing process into brilliant blue grey shades possessing very good fastness to washing, milling and light.

The coupling component used above has been obtained by treating 1.7-aminonaphthol with chloroformic acid-n-butyl-glycolester (B. P. 14 mm.: 93–94° C.).

Example 4

23.4 parts of 4-nitro-2-aminophenol-6-sulfonic acid are diazotized and coupled in presence of a suitable quantity of sodium carbonate with 27.5 parts of 1-(7-hydroxynaphthyl)-carbamic acid ethylglycol ester, dissolved in 300 parts of water together with 4 parts of sodium hydroxide. The new dyestuff is isolated by salting it out and filtering. In dry state it is a black powder soluble in concentrated sulfuric acid with a red coloration.

Its formula is:

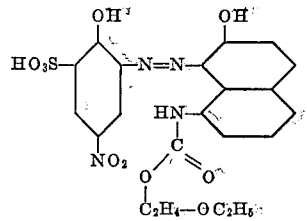

The new dyestuff dyes wool according to the one-bath chroming or after-chroming method into olive green to green shades that possess very good fastness to light, to milling and to washing.

For the preparation of the chrome complex compound the quantity of the dyestuff obtained as above described is suspended in 1200 parts of water containing 75 parts of sulfuric acid (10%) and 50 parts of chrome alum and heated under a reflux condenser to the boil for 24 hours. After cooling down the chrome complex precipitates practically totally in form of violet-black needles which can be well filtered and which are soluble in water with a green coloration. In dry state the chrome containing dyestuff is a dark powder soluble in concentrated sulfuric acid with a Bordeaux-red coloration. It dyes wool from a mineral acid bath into olive-green shades, possessing excellent fastness to washing, to milling and to light.

What I claim is:

1. A monoazo dyestuff corresponding to the formula

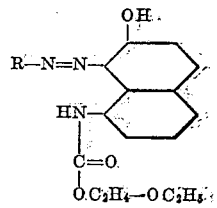

wherein R stands for an ortho-aminophenol-sulfonic acid radical.

2. A monoazo dyestuff corresponding to the formula

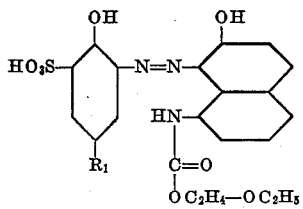

wherein $R_1$ stands for a member selected from the group consisting of chlorine, nitro, benzoylamino and —NH.COO— lower alkyl.

3. The monoazo dyestuff of the formula

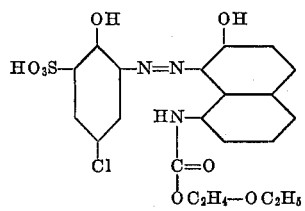

4. The monoazo dyestuff of the formula

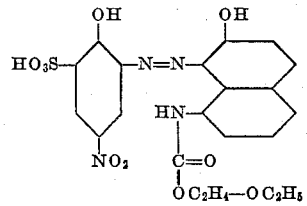

5. The monoazo dyestuff of the formula

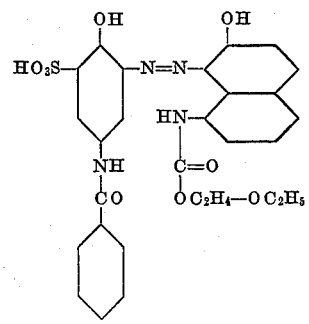

WILLY STEINEMANN.

REFERENCES CITED

The following references are of record in the file of this patent:

UNITED STATES PATENTS

| Number | Name | Date |
|---|---|---|
| 2,073,470 | Fleischhauer | Mar. 9, 1937 |
| 2,087,425 | Boyer et al. | July 20, 1937 |
| 2,447,163 | Conzetti | Aug. 17, 1948 |

FOREIGN PATENTS

| Number | Country | Date |
|---|---|---|
| 588,771 | Great Britain | June 3, 1947 |
| 597,542 | Great Britain | Jan. 28, 1948 |